United States Patent [19]

Andersen

[11] 4,276,314
[45] Jun. 30, 1981

[54] METHOD OF PREPARING HASH BROWN POTATO PRODUCT

[75] Inventor: Lowell J. Andersen, Grand Forks, N. Dak.

[73] Assignee: International Co-op, Grand Forks, N. Dak.

[21] Appl. No.: 55,066

[22] Filed: Jul. 5, 1979

Related U.S. Application Data

[63] Continuation of Ser. No. 845,806, Oct. 27, 1977, abandoned.

[51] Int. Cl.³ ............................................. A23L 1/216
[52] U.S. Cl. .................................... 426/272; 426/509; 426/524; 426/637
[58] Field of Search ............... 426/524, 523, 509, 506, 426/512, 518, 438, 439, 497, 637, 272

[56] References Cited

U.S. PATENT DOCUMENTS

| | | | |
|---|---|---|---|
| 3,773,527 | 11/1973 | Ruggerone | 426/637 |
| 3,812,274 | 5/1974 | Weaver et al. | 426/524 |
| 4,156,744 | 5/1979 | Kiploks et al. | 426/637 |

Primary Examiner—Joseph M. Golian
Assistant Examiner—George C. Yeung
Attorney, Agent, or Firm—Dorsey, Windhorst, Hannaford, Whitney & Halladay

[57] ABSTRACT

A process for preparing a frozen hash brown potato product including cooking raw potato slabs, cooling cooked potato slabs, cooling the cooked potato slabs to a temperature of approximately 40° to 45° F. and then immediately shredding the cooled potato slabs and forming the shredded material into cakes of a desired shape and size. With this method, the formed potato cakes are held together by the natural binding material of the potato, without the addition of other binding agents.

8 Claims, 1 Drawing Figure

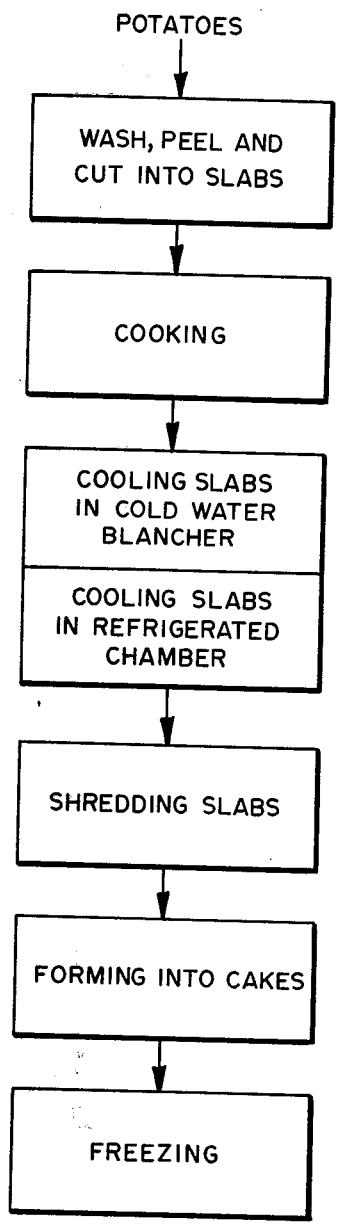

METHOD OF PREPARING HASH BROWN POTATO PRODUCT

This is a continuation of application Ser. No. 845,806, filed Oct. 27, 1977, now abandoned.

BACKGROUND OF THE INVENTION

The present invention relates generally to a method of preparing hash brown potatoes, and particularly, to a method of preparing a frozen hash brown potato product in the form of a cake or patty which eliminates the necessity of using conventional additive binding agents such as potato flour, potato flakes and the like to hold the patty together.

The prior art shows that many methods are employed in the preparation of frozen hash brown potatoes and frozen hash brown potato products which are formed into individual cakes or patties for ultimate frying or deep-fat cooking by the consumer. The conventional process employed in the production of such potato products includes washing, peeling and otherwise preparing the raw potato, cooking the potato either in whole form or in slabs, shredding the potato or potato slabs into a hash brown consistency, and thereafter cooling the shredded potato product. Certain binding agents such as potato flour, potato flakes, wheat flour, rice flour and various types of modified corn starches are then mixed with this cooled, shredded potato product, after which the same is formed into patties or cakes of the size and shape desired. The formed patties or cakes are then transported to a freezer where the product is frozen and thereafter packaged.

One disadvantage of the conventional procedure described above is the necessity of adding binding agents such as potato flour, potato flakes, etc. to the shredded potato product to insure that the cakes or patties will hold together during the forming step and during the eventual deep-fat cooking step. The addition of these binding agents not only increases the cost of the product, but also requires an additional mixing step which increases the amount of time necessary to prepare the hash brown product. This necessarily results in a further increase in the cost of the product. Therefore, a need exists in the art for a method of preparing hash brown potato products, and particularly, hash brown potato products which are formed into cakes or patties which do not require the addition of binding agents such as potato flour, potato flakes and the like.

SUMMARY OF THE INVENTION

In contrast to the prior art, the present invention relates to a process for preparing hash brown potato products, and more particularly, frozen hash brown potato products which are formed into cakes or patties without the need for additional binding agents as used in the conventional processes in the prior art. Despite the absence of any additional binding agents, the hash brown cakes and patties produced according to the present invention have a desired texture and remain intact, without breaking up, even when cooked in deep fat. This is accomplished by utilizing the natural binding material of the potato rather than adding other binding agents.

More specifically, the inventor has discovered that the cooking step, the cooling step, the sequence of the cooling and shredding steps and the temperature at which the slabs are shredded are important factors affecting the texture of the final potato product and the release of the natural binding material in the potato. One of the conventional steps in the prior art has been to shred the potato or potato slabs into hash brown consistency immediately after the cooking step or after an initial cooling and then further cool the shredded potato material to a desired temperature. At this time, the binding agents are added and the shredded potato material formed into patties or cakes. In the method of the present invention, however, the conventional shredding and cooling steps are reversed. According to the present invention, the potato slabs which exit from the cooking blancher are first cooled in a cold water blancher to approximately 50° to 55° F. after which they are further cooled by chilled air so that the internal temperature is between 40° and 45° F. The cooled potato slabs are then shredded into hash brown consistency directly into the forming machine which molds the shreds into a shaped form. The inventor has found that by cooling the potato slabs and then shredding as opposed to the conventional method of shredding and then cooling, the release of the natural binding material from the potatoes can be controlled and such natural binding material from the potatoes can be utilized in retaining the formed potato product in its desired shape without the use of additional binding agents. It has been found that hash brown potato cakes or patties prepared by this method will withstand final preparation conditions of deep-fat frying at temperatures of 365° to 375° F. for at least 2½ to 3½ minutes with no disintegration or breaking apart.

Accordingly, it is an object of the present invention to provide an improved process for preparing a frozen hash brown potato product in the form of cakes or patties without using additional binding agents such as potato flour, potato flakes, and the like.

Another object of the present invention is to provide an improved process for preparing a frozen hash brown potato product in the form of cakes or patties which utilize the natural binding materials in the potato product to retain the formed product in its desired shape without breaking apart even during deep-fat cooking.

Another object of the present invention is to provide an improved process for preparing a frozen hash brown potato product in the form of cakes or patties in which the cooked potato slabs are cooled in a controlled environment to a temperature of about 40° to 45° F., after which the cooled slabs are shredded and formed into cakes and patties of the desired shape and size.

These and other objects of the present invention will become apparent with reference to the description of the preferred method, the drawing and the appended claims.

BRIEF DESCRIPTION OF THE DRAWINGS

The drawing is a flow sheet diagram generally illustrating the various method steps and procedures of the present invention.

DESCRIPTION OF THE PREFERRED METHOD

With reference to the drawing, the present invention relates generally to a method of preparing a frozen hash brown potato product in the form of patties or cakes. In general, such method comprises the following method steps:

(a) Washing, peeling and otherwise preparing the potatoes for cooking;
(b) Passing the raw potato slabs through a hot water blancher for cooking;

(c) Passing the cooked potato slabs through a cold water blancher for initial cooling;

(d) Passing the initially cooled potato slabs through a refrigerated chamber for further cooling by chilled air;

(e) Shredding the cooled potato slabs into shreds of a hash brown consistency and directing the shredded potatoes into a forming machine for molding into a shaped form; and (f) Freezing and packaging the resulting product.

The first step in the process is to wash, peel, trim and otherwise prepare the raw potatoes for slabbing. This may be done manually or by any conventional mechanical means known in the art. After the potatoes are peeled and trimmed, they are cut into potato slabs approximately ½ to 5/8 inches thick. This slabbing can be accomplished by any method known in the art, however, in the preferred method, the potatoes are sliced into slabs of the desired thickness by passing them through a Urschel Model H-S cutter or any other mechanical cutter.

These raw slabs of potatoes are then cooked by passing them through a reel-type hot water blancher. The purpose of this hot water blanch is to cook the potato slab to the desired texture, to inactivate the enzyme system of the potato and to remove, if necessary, excessive levels of reducing sugars which would otherwise cause the product to be excessively dark upon final preparation. Although all three of these objectives are conventional in the art, the inventor has found that certain of the cooking conditions are important in achieving the proper potato texture. In hot water blanchers of the type utilized in the preferred method, the water temperature and the dwell time of the potatoes in the blancher are important in providing a cooked potato with an acceptable texture. Although the potato slabs can be sufficiently cooked under a variety of water temperature and dwell times, the inventor has found that to produce a potato of the proper and desired texture, the water temperature should preferably be maintained between about 178° F. and 186° F. at a dwell time of preferably between about eleven and thirteen minutes. If the dwell time in the blancher is less than eleven minutes or the temperature is less than 178° F., the potato is undercooked and does not exhibit the final texture characteristics necessary to hold the shredded potato together as it is compacted into its final shape. On the other hand, if the dwell time in the blancher exceeds thirteen minutes or if the water temperature exceeds 186° F., a potato slab with an overcooked texture is produced. When this happens, the formed pattie or cake is easily deformed as it is being released from the forming equipment, resulting in an unacceptable product. Also, during this cooking or hot water blanching step, sodium acid pyrophosphate may be introduced into the blancher at an appropriate level to prevent the potato slabs from turning gray or discoloring after cooking. Also, if necessary, dextrose may be added during the hot water blanching step to control the color of the product for final preparation. Both the addition of the sodium acid pyrophosphate and the dextrose during this cooking step are common practice for the industry.

The next step involves cooling the potato slabs to a desired temperature. In the preferred method, this is accomplished in two steps. First, the cooked potato slabs are introduced into a reel-type cold water blancher through which cold water is circulated. Refrigerated cooling coils are disposed within this water blancher to help keep the water cold. The principal purpose of this initial cooling step is to stop the cooking process and to set up the starch cells in the potatoes. In this cold water blancher, the internal temperature of the potato slabs is preferably reduced to a temperature range of between 50° and 55° F. The dwell time of the potato slabs in the cold water blancher necessary to reduce the temperature to this range, of course, is related to the temperature of the water in the blancher. It is preferable to use chilled or refrigerated water in this blancher in order to shorten the dwell time of the potato slabs as much as possible. If the potato slabs are held in the cold water blancher for prolonged periods due to warmer temperatures of the water, the possibility of bacteriological growths will increase. In the preferred method, water enters the cold water blancher at a temperature of about 40° F. and during the process is retained at a temperature of between about 53° and 73° F. during its circulation through the blancher. This temperature results in an approximate dwell time of about eighteen minutes to cool the slabs of potato to the desired temperature of between 50° and 55° F.

The second portion of the cooling step involves further cooling of the potato slabs by exposing the slabs to a stream of refrigerated or chilled air. More specifically, this cooling step involves passing the cooked and initially cooled potato slabs through a refrigerated chamber where they are exposed to a counter-current stream of chilled air. Several factors control the temperature to which the slabs of potato are cooled in this step. Firstly, the temperature of the potato slabs at the entrance to the refrigerated chamber, secondly, the rate at which the slabs are conveyed through the chamber, and thirdly, the temperature, velocity and quantity of the chilled air contacting the potato slabs as they pass through the chamber. In the preferred method, the potato slabs are preferably cooled in the refrigerated chamber to the temperature of between about 40° F. and 45° F. The ultimate effect of this slab temperature is to control the integrity of the shred produced during the shredding step and to control the amount of starch exposed in the shred. It has been found that if potato slabs enter the shredder at temperatures higher than about 45° F., they will not produce a clean shred. Instead, a ragged, uneven, fractured shred will be produced. When this happens, a "mushy" character in the bind is produced and difficulty will be encountered in producing properly formed product. On the other hand, if the temperature of the potato slab is lower than 40° F., insufficient starch will be exposed at the surface of the shred and a poor natural binding will result.

In the preferred method, the potato slabs enter the refrigerated chamber with an internal temperature between 50° and 55° F. If the temperature of the slabs exceeds 55° F., difficulty will be encountered in reducing the temperature of the slabs to at least 45° F. at the exit from the refrigerated chamber. Also, in the preferred procedure, chilled air at an approximate temperature of between 25° and 30° F. is exposed to the potato slabs in the refrigerated chamber at a rate of up to about 240,000 cubic feet per minute. The approximate dwell time of the potato slabs in the refrigerated chamber under these conditions can be anywhere from about 6½ minutes to 20 minutes, depending upon the amount of shredded product on the conveyor belt.

The next step in the method of the present invention is to shred the cooled slabs of potatoes into pieces of approximately 1/16 of an inch by 3/16 of an inch, with the length of such shreds being variable. In the preferred method, this shredding is accomplished by a conventional comminuter used for this purpose. Preferably, the slabs of potatoes are shredded directly into a conventional forming machine which molds the shredded potato product into a shaped cake or patty of the desired size and shape. It should be noted that according to the present process, the potato slabs are shredded directly into the forming machine, without the addition of other binding agents or starches which are necessary in prior art methods to hold the shredded material together. With the present procedure, the natural binding material in the potato is utilized to hold the shredded potato material together during forming and during ultimate cooking.

After the shredded potato material has been formed, the formed cakes and patties are transported through a conventional freezer tunnel where the product is thoroughly frozen. After freezing, the product is packaged and held in frozen storage in a manner known in the art.

It is believed that the principal area of novelty in the present procedure is in the sequencing of the cooling and shredding steps. As described above, the present method requires substantial cooling of the cooked potato slabs down to a temperature between 40° and 45° F. before shredding. This is direct contrast to the conventional methods which involve shredding the cooked potatoes or potato slabs shortly after cooking and then cooling the shredded material. Cooling the slabs within the limits described above in accordance with the present invention provide for control over the release of the natural binding material of the potato. This natural binding material is cooked, cooled starch. By having the ability to control the release of this natural binding material in the potato slabs, other binders or starches such as potato flour, potato flakes, wheat flour, rice flour and various types of modified corn starches do not have to be employed to effect a cohesive action.

Hash brown patties and cakes prepared according to the present invention have been tested and have been found to withstand the final preparation conditions of deep-fat cooking at temperatures of 365° F. to 375° F. for at least 2½ to 3½ minutes.

Although the description of the preferred method has been quite specific, it is contemplated that various modifications and changes could be made to this preferred method without deviating from the spirit of the present invention. Therefore, it is intended that the scope of the present invention be dictated by the appended claims rather than by the drawing or the description of the preferred method.

I claim:

1. A process for preparing a frozen hash brown potato product consisting essentially of the following method steps:
    washing and peeling raw potatoes;
    cooking said raw potatoes by exposure to hot water or steam;
    cooling said potatoes to a temperature of about 50° to 55° Farenheit by exposing the potatoes to cold water and then further cooling said potatoes to a temperature of about 40° to 45° Farenheit by exposing the potatoes to a refrigerated chamber;
    shredding the cooled potatoes at a temperature of about 40° to 45° Farenheit immediately after cooling to said temperature;
    immediately forming the shredded potato material into cakes of a desired shape and size without the addition of binding agents; and
    freezing the cakes.

2. The process of claim 1 including cutting the raw potatoes into slabs prior to cooking.

3. The process of claim 2 wherein the shredded potato material is formed into cakes of a desired shape and size and retained in such shape by the natural binding material of the shredded potato.

4. The process of claim 3 wherein the cooled potato slabs are shredded and formed into cakes without further cooling.

5. The process of claim 4 wherein the raw potatoes are cut into slabs approximately ½ inch to 5/8 inch thick.

6. The process of claim 5 wherein the cooled potato slabs are shredded to a size of approximately 1/16 inch by 3/16 inch.

7. The process of claim 1 wherein said freezing step includes freezing the cakes immediately after formation of the cakes.

8. A process for preparing a frozen hash brown potato product comprising the following method steps:
    washing and peeling raw potatoes;
    cooking said raw potatoes by exposure to hot water or steam;
    cooling said potatoes to a temperature of about 40° to 45° Farenheit by first cooling said potatoes by exposure to cold water and then further cooling said potatoes by exposure to refrigerated air;
    shredding the cooled potatoes into shreds at a temperature of about 40° to 45° Farenheit immediately after cooling to said temperature, said shreds being of hash brown consistency, having dimensions of approximately 1/16 inch by 3/16 inch and varying in length;
    immediately forming the shredded potato material into cakes of a desired shape and size without the addition of binding agents; and
    freezing the cakes.

* * * * *